F. P. WHITE.
WHEEL HUB.
APPLICATION FILED NOV. 10, 1913.
1,120,776.
Patented Dec. 15, 1914.
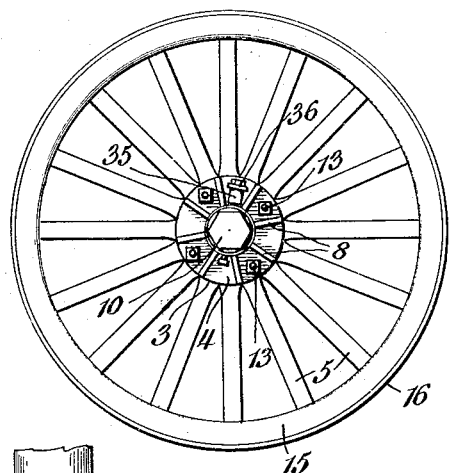
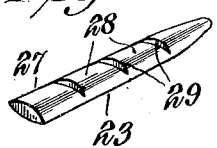
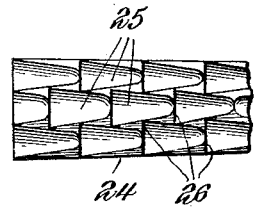
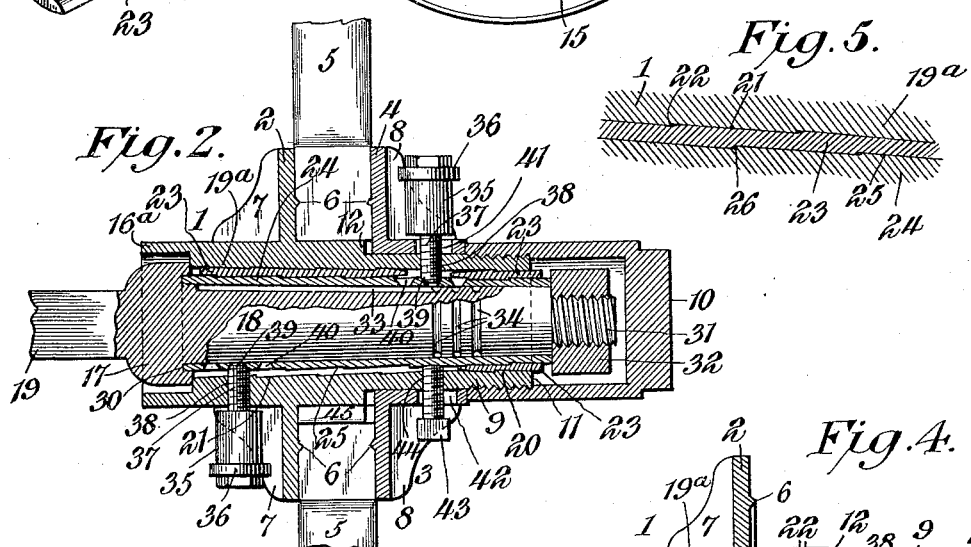
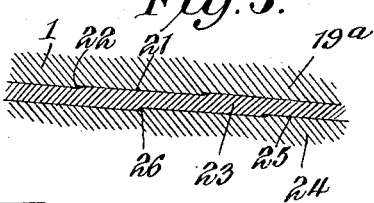
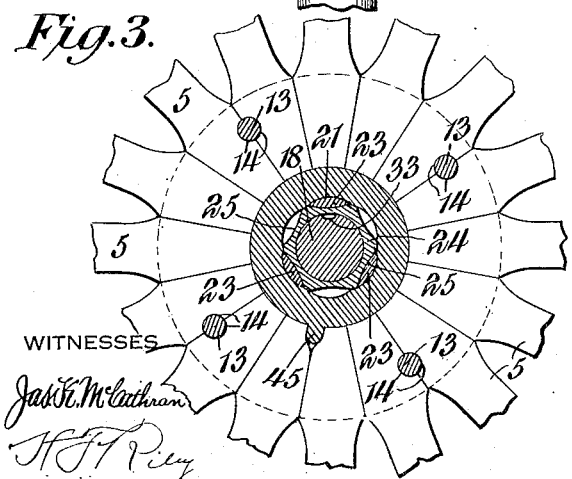
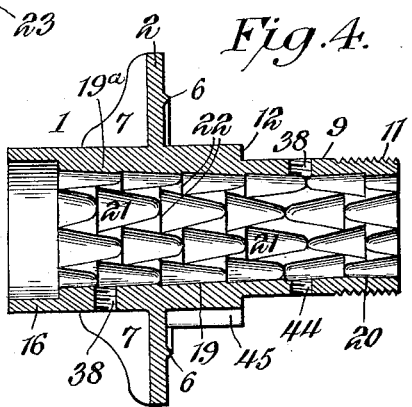
Franklin P. White,
INVENTOR
WITNESSES
BY
ATTORNEY

UNITED STATES PATENT OFFICE.

FRANKLIN P. WHITE, OF SHALLOTTE, NORTH CAROLINA.

WHEEL-HUB.

1,120,776. Specification of Letters Patent. Patented Dec. 15, 1914.

Application filed November 10, 1913. Serial No. 800,181.

*To all whom it may concern:*

Be it known that I, FRANKLIN P. WHITE, a citizen of the United States, residing at Shallotte, in the county of Brunswick and State of North Carolina, have invented a new and useful Wheel-Hub, of which the following is a specification.

The invention relates to improvements in wheel hubs.

The object of the invention is to improve the construction of hubs for vehicle wheels and to provide a light, strong, practical metallic vehicle wheel hub of compact and inexpensive construction equipped with means for enabling the axle box to be readily trued with the rim of the wheel when it is necessary.

A further object of the invention is to provide a wheel hub adapted to enable the spokes to be removed and replaced or repaired without removing the tire or rim of the wheel.

With these and other objects in view the invention consists in the construction and novel combination and arrangement of parts hereinafter fully described, illustrated in the accompanying drawing and pointed out in the claims hereto appended, it being understood that various changes in the form, proportion and minor details of construction within the scope of the claims may be resorted to without departing from the spirit or sacrificing any of the advantages of the invention.

In the drawings:—Figure 1 is a side elevation of a wheel provided with a metallic hub constructed in accordance with this invention. Fig. 2 is an enlarged sectional view taken longitudinally of the hub. Fig. 3 is a similar view taken transversely of the hub. Fig. 4 is a detail longitudinal sectional view of the main section of the hub. Fig. 5 is an enlarged detail section view illustrating the manner of interlocking the axle box with the hub. Fig. 6 is a perspective detail view of one of the wedges. Fig. 7 is a detail view of a portion of the axle box showing the exterior ratchet recesses for engaging the wedges.

Like numerals of reference designate corresponding parts in all the figures of the drawing.

In the accompanying drawing in which is illustrated the preferred embodiment of the invention, the metallic hub, which may be constructed of any suitable metal, comprises in its construction a main section 1 having a fixed annular flange 2 and a movable section 3 carrying an adjustable annular flange 4 spaced from the fixed annular flange 2 to receive the inner ends of spokes 5. The spokes 5 are clamped between the annular flanges 2 and 4 and are held against outward radial movement by annular ribs 6 oppositely beveled and adapted to be embedded in the side edges of the inner ends of the spokes, as clearly illustrated in Fig. 2 of the drawing. The annular spoke clamping flanges 2 and 4 are preferably braced by webs 7 and 8 formed integral with the main and removable sections of the hub. The main section consists of a substantially cylindrical body reduced at the outer portion 9 to receive the removable section 3 which is retained on the main section in engagement with the spokes by means of a cap nut 10 arranged on the outer end 11 of the main section 1 which is exteriorly threaded to engage the interior threads of the cap nut. The cap nut also forms a closure for the outer end of the hub and excludes dust and dirt from the interior thereof. The inner ends of the spokes fit against the exterior of the central portion of the main section of the hub, and the shoulder 12 formed by reducing the outer portion of the main section is spaced from the clamping flange 4 to enable the latter to be drawn tightly into engagement with the spokes by a series of bolts 13 piercing the flanges 2 and 4 and passing between the adjacent spokes which are provided with registering grooves 14 for the bolts, as clearly illustrated in Fig. 3 of the drawing. The outer ends of the spokes are secured in the usual manner to a rim or felly 15 having a tire 16 arranged on it. When it is desired to remove a spoke or otherwise repair the wheel the section 3 may be detached by removing the axle nut to expose the spokes and permit the latter to be removed without taking off the rim or tire of the wheel.

No claim is made in the present application to the means for clamping the spokes.

The hub, which is interiorly recessed at the inner end to provide a projecting cuff or portion 16ᵃ to fit over the collar 17 at the inner end of the spindle 18 of an axle 19, has its interior oppositely tapered inwardly from each end, as clearly shown in Figs. 2 and 4 of the drawing; but in short hubs only a single taper may be provided. The tapered portions 19ª and 20 of the interior of the hub are provided with recesses or cavities 21 preferably forming an annular series of longitudinal rows, the recesses or cavities of each row being staggered with relation to the recesses or cavities of the adjacent rows. Each recess or cavity tapers longitudinally and also in depth and is curved transversely, forming a shoulder 22 at one end, the shoulders 22 of each row being arranged opposite the intervals or spaces between the shoulders of the adjacent rows. The shoulders of the recesses or depressions form ratchet teeth and are adapted to engage wedges 23 and arranged in inner and outer series and preferably constructed of wood and adapted to enable an axle box 24 to be centered or trued with respect to the rim when it becomes necessary to true the wheel. This construction provides a metallic hub capable of having its axle box trued from time to time with the rim, thereby greatly increasing the life of a wheel.

The axle box which has a smooth interior to form a bearing for the spindle is exteriorly tapered and is provided with exterior cavities or recesses 25 arranged in longitudinal rows and staggered similar to the recesses or cavities of the hub. The recesses or cavities of the axle box correspond in size, shape and construction with the recesses or cavities of the hub and they form end shoulders 26 for engaging the wedges 23. The wedges 23 which are driven into the hub between the inner face thereof and the exterior of the axle box are tapered longitudinally and have their side faces curved transversely presenting convex surfaces to the hub and the axle box. One side face 27 of each wedge is preferably recessed to form a longitudinal series of tapered portions 28 having end shoulders 29 to engage with the recesses or cavities of either the hub or the axle box; but each face of the wedges may be similarly recessed if desired. The wooden wedges which enable the axle box to be readily driven out of the hub when desired, constituting a simple and efficient means for securing the axle box within the hub and they enable the axle box to be readily trued and they hold the axle box against sliding movement longitudinally of the hub and also prevent any radial or rotary movement of the axle box with respect to the hub. The inner and outer wedges have a combined length substantially equal to the length of the axle box, and they form practically a continuous support for the hub.

The collar 17 of the axle is provided with an annular groove or recess 30 in its shoulder to receive the inner end of the axle box whereby a dust-tight joint is formed for excluding dust and dirt from the interior of the bearing of the wheel. The outer end 31 of the spindle is reduced and threaded to receive an axle nut 32 arranged within the cap nut 10 and engaging the outer end of the axle box. The spindle is preferably provided with longitudinal and annular lubrication-receiving and distributing grooves 33 and 34, and lubrication is supplied to the bearing of the wheel by inner and outer cups 35, having suitable closures 36 and provided with threaded stems 37 mounted in threaded openings 38 in the main section of the hub and having tapered terminals 39 which fit in tapered counter-sunk openings 40 in the axle box. The adjustable section 3 of the hub is provided with a slot 41 to receive the stem of the outer lubrication cup so that the latter will not interfere with any adjustment of said section 3. The section 3 is also provided with a slot 42 having a set or clamping screw 43 mounted in a threaded opening 44 of the main section of the hub and engaging the exterior of the axle box.

Any number of sets of wedges within the capacity of the hub may be employed for securing the axle box in place, and the main section of the hub is preferably provided with a central longitudinal rib 45 which forms a stop for the inner ends of the adjacent spokes.

What is claimed is:

1. A metallic hub including a metallic axle box, and a plurality of wedges consisting of independently adjustable bars of relatively soft material arranged within the hub and engaging the axle box and holding the latter in position.

2. A hub provided with interior shoulders or teeth and including an axle box, and a plurality of wedges consisting of independently adjustable bars interposed between the axle box and the hub and engaged by the said shoulders or teeth of the latter.

3. A hub including an axle box provided with exterior shoulders or teeth, and a plurality of wedges consisting of independently adjustable bars arranged within the hub and engaging the shoulders or teeth of the axle box.

4. A hub provided with interior shoulders or teeth and including an axle box having exterior shoulders or teeth, and wedges consisting of bars of relatively soft material arranged within the hub and interposed between the same and the axle box and engaging the said shoulders or teeth.

5. A hub having an axle box and provided with interior recesses or depressions arranged in rows and tapered longitudinally, and wedges arranged within the hub around the axle box and engaging the said recesses or depressions.

6. A hub having an axle box and provided with interior recesses or depressions arranged in rows and tapered longitudinally, and wedges arranged within the hub around the axle box and tapered at intervals to provide projecting portions for engaging the recesses or depressions.

7. A hub having interior recesses or cavities arranged in rows and tapered longitudinally, an axle box arranged within the hub and provided with exterior recesses or cavities also arranged in rows and tapered longitudinally, and wedges arranged within the hub around the axle box and engaging the said recesses or cavities.

8. A hub having interior recesses or cavities arranged in rows and tapered longitudinally, an axle box arranged within the hub and provided with exterior recesses or cavities also arranged in rows and tapered longitudinally, wedges arranged within the hub and interposed between the interior thereof and the axle box and provided with tapered portions for engaging with the said recesses or cavities.

9. A hub having its interior tapered inwardly from each end, an axle box arranged within the hub, and inner and outer series of wedges consisting of independently adjustable bars interposed between the axle box and the hub and engaging the said tapered portions thereof, said bars having a combined length substantially equal to the length of the axle box.

10. A hub including an axle box and provided with rows of recesses or cavities tapered longitudinally and curved in cross section and forming shoulders, and wedges arranged within the hub around the axle box and presenting curved side faces and consisting of a plurality of tapered portions for engaging the recesses or cavities.

In testimony that I claim the foregoing as my own, I have hereto affixed my signature in the presence of two witnesses.

FRANKLIN P. WHITE.

Witnesses:
S. E. WHITE,
FLAXIE STANLAND.

Copies of this patent may be obtained for five cents each, by addressing the "Commissioner of Patents, Washington, D. C."